Sept. 18, 1923.

J. T. BOOTH 1,468,225

INTERNAL COMBUSTION ENGINE

Filed Aug. 28, 1922    12 Sheets-Sheet 2

J. T. BOOTH

1,468,225

INTERNAL COMBUSTION ENGINE

Filed Aug. 28, 1922    12 Sheets-Sheet 8

Sept. 18, 1923.

J. T. BOOTH 1,468,225

INTERNAL COMBUSTION ENGINE

Filed Aug. 28, 1922     12 Sheets-Sheet 11

Inventor –
John Thomas Booth
By
B. Singer, Atty.

Patented Sept. 18, 1923.

1,468,225

UNITED STATES PATENT OFFICE.

JOHN THOMAS BOOTH, OF BIRMINGHAM, ENGLAND.

INTERNAL-COMBUSTION ENGINE.

Application filed August 28, 1922. Serial No. 584,745.

*To all whom it may concern:*

Be it known that I, JOHN THOMAS BOOTH, subject of the King of Great Britain, residing at 69 Stafford Road, Handsworth, Birmingham, in the county of Warwick, England, have invented certain new Improvements in Internal-Combustion Engines, and I do hereby declare the following to be a full, clear, and exact description of the same.

This invention relates to internal combustion engines and is intended primarily for two stroke engines.

In two stroke engines as at present usually constructed it is the custom to draw the explosive mixture into the crank case and to establish a connection between the crank case and the working cylinder so that the charge is able to enter the cylinder behind the exhaust gases so as to remove them from the cylinder. One of the disadvantages associated with this method is a certain waste of explosive mixture and the primary object of the present invention is to provide a construction wherein a definite volume of explosive mixture at a definite pressure is supplied to the cylinder at each cycle of operations.

According to the present invention the engine is provided with a reciprocating valve controlling the inlet of mixture to the pumping cylinder and a receiving chamber which receives the mixture from the pumping cylinder and a valve controlling the passage of the mixture from the receiver to the working of the cylinder.

The valve which controls the inlet of mixture to the pumping cylinder, which may be referred to as the inlet valve, and the valve which governs the passage of mixture from the receiver to the working cylinder, which may be referred to as the transfer valve, may be both operated from the same shaft by means of connecting rods or equivalent means.

My invention is particularly applicable to two stroke engines having two or multiples of two cylinders and for each unit of two cylinders I may provide one reciprocating inlet valve and one receiver, and one reciprocating transfer valve.

Referring to the drawings.

In the construction shown in Figures 1, 2, 3, and 4, the receiving chamber 1 and the transfer valve 2 are located between the two working cylinders 3, the axis of the receiving chamber 1 being at right angles to the axes of the cylinders while the transfer valve consists of a sleeve working in the cylinder 4 arranged between the upper parts of the two working cylinders upon an axis which is at right angles thereto.

Figure 1:
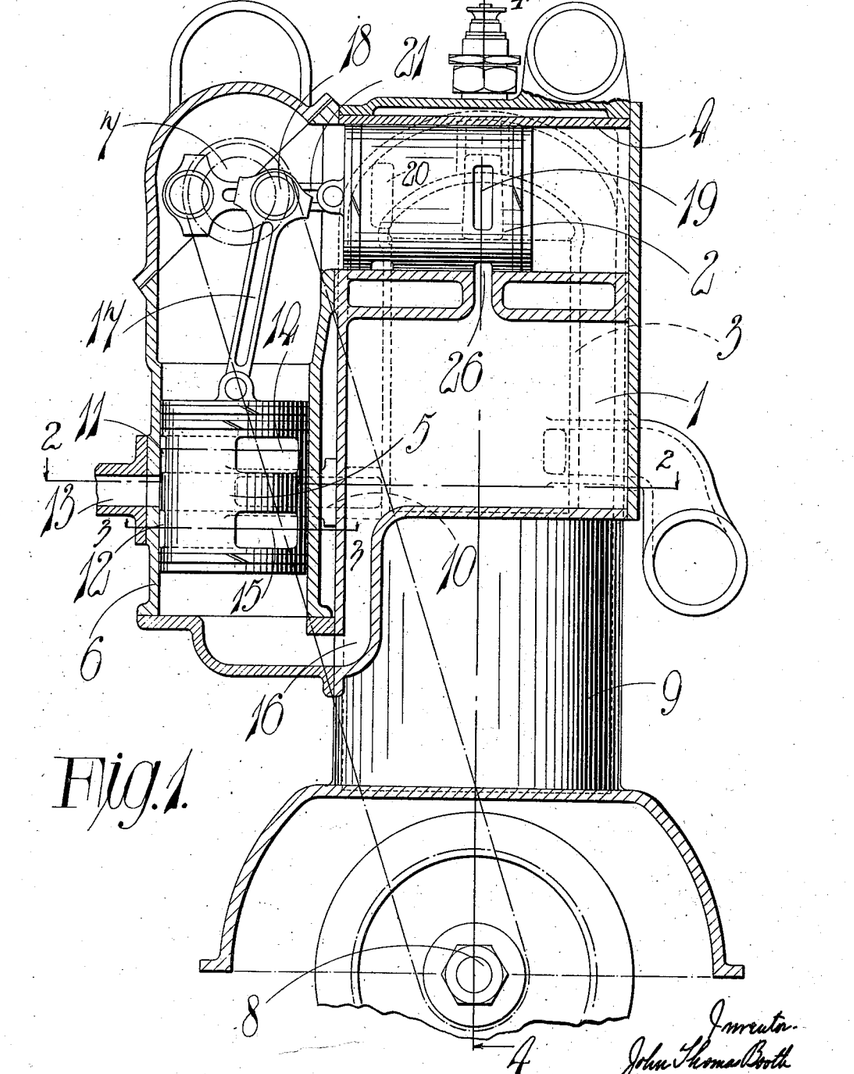
Figure 1 is a transverse sectional end view showing one form of the invention.
Figure 2:
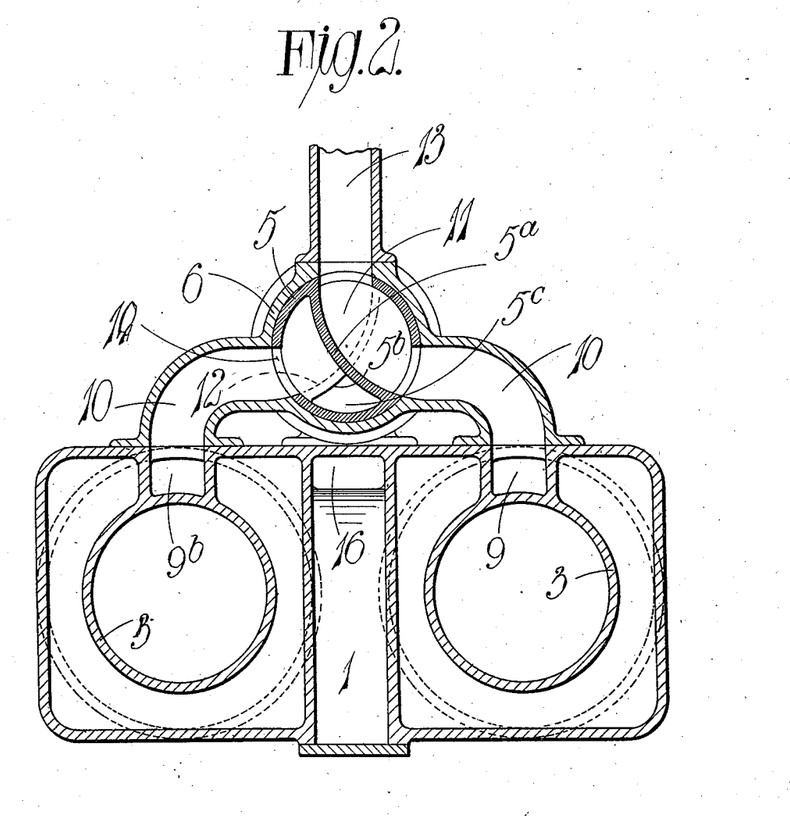
Figure 2 is a sectional view on line 2—2 in Figure 1 but showing the valve in a position in which it communicates with the induction pipe and one pump cylinder.
Figure 3:
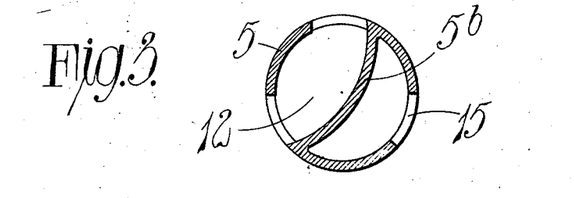
Figure 3 is a cross section of the inlet valve employed both in the construction shown in Figure 1 and in Figure 4, taken on the line 3—3 in Figure 1.
Figure 4:
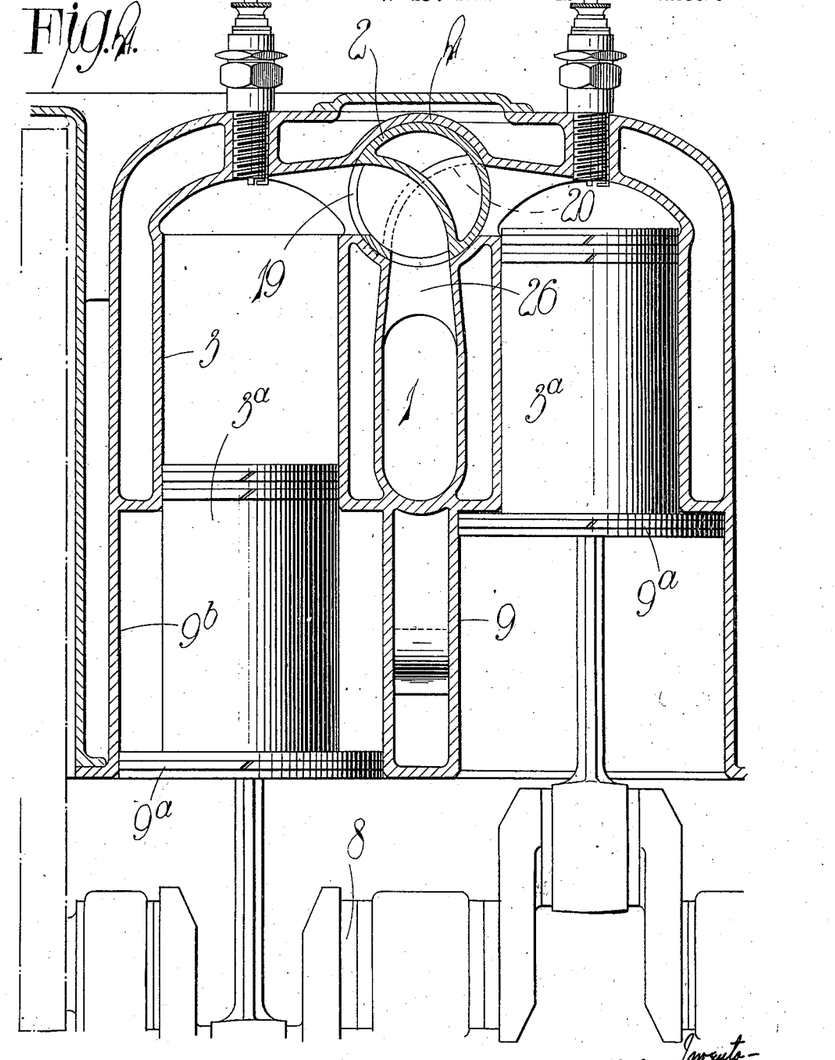
Figure 4 is a transverse sectional view on the line 4—4 in Figure 1.

Any other convenient relationship of the two valves and receiver may be employed but it is preferred always to place the receiver near the working cylinder heads so that the gases in the receiver will be the more thoroughly vaporized.

The inlet valve 5 comprises a ported cylindrical valve working in a cylinder 6 which is arranged in front or to the rear of the working cylinders and upon an axis parallel thereto.

The shaft 7 from which the inlet and transfer valves are operated is arranged at a point where the axes of the inlet and transfer valves intersect. This shaft 7 may be driven by any suitable means such, for instance, as chain or other gearing from the main shaft 8 of the engine, and it is preferably driven at the same speed as the main shaft 8 of the engine.

The pumping cylinders 9 are arranged beneath or at the forward ends of the working cylinders 3, the working pistons 3ª being provided with an enlarged portion 9ª for operating in the pumping cylinders in the known way.

Passages 10 are provided leading from the cylinder 6 which contains the inlet valve to the pumping cylinders, assuming that there are two. The inlet valve 5 is provided with two ports 11 and 12 which are spaced apart along the length of the cylinder which forms the valve, one 11 of which serves to place the induction pipe 13 in communication with one pump cylinder 9, and the other 12 serves to place the induction pipe into communication with the other pump cylinder 9ᵇ. The inlet valve is hollow and the ports 11 and 12 pass across the valve and are isolated from its interior by the diaphragms 5ª—5ᵇ respectively which form closed passages within the valve (see Figures 2 and 3). The inlet valve is also provided with ports 14 and 15 which communicate with the hollow interior of the valve and are adapted to receive the gas as it passes from the pump associated with one working cylinder when it passes through the hollow interior of the inlet valve, through the opening 5ᵇ into the lower end of the valve cylinder and from there through the passage 16 to the receiving chamber 1. The lower end of the inlet valve is open and the upper end is closed.

Instead of being constructed in the manner above described the inlet valve may be constructed like two piston valves joined together by a hollow central trunk. Each piston portion is provided with a port for establishing communication between the induction pipe and a pumping cylinder and between the two piston like portions the gas is able to enter as it passes from the pumping cylinders to the receiving chamber.

The inlet valve 5 is driven by a connecting rod 17 connected to a crank 18 upon the shaft 7 which is driven by gearing from the main shaft 8 of the engine and when the inlet valve is in its mid position the crank and connecting rod are substantially at right angles so that the said valve will have quick opening and closing movements.

The transfer valve 2 consists of a sleeve working in a cylinder 4 and having two ports one of which 19 serves to connect the receiving chamber 1 with one working cylinder and the other of which 20 serves to connect the receiving chamber with the other working cylinder. These two ports 19 and 20 are spaced apart along the length of the valve 2 and this valve also is driven by a connecting rod 21 connected to a crank upon the shaft 7 which operates the inlet valve. When this valve is in either of its end positions, i. e. a position wherein it has placed the receiving chamber in communication with one of the working cylinders, its connecting rod and crank are substantially in alignment so that in these positions the motion of the valve 2 is at its slowest.

A port 26 is provided leading from the receiver into the cylinder 4, which port allows of the passage of the gas from the receiver through the ports 19 or 20 into the working cylinders.

Figure 5:
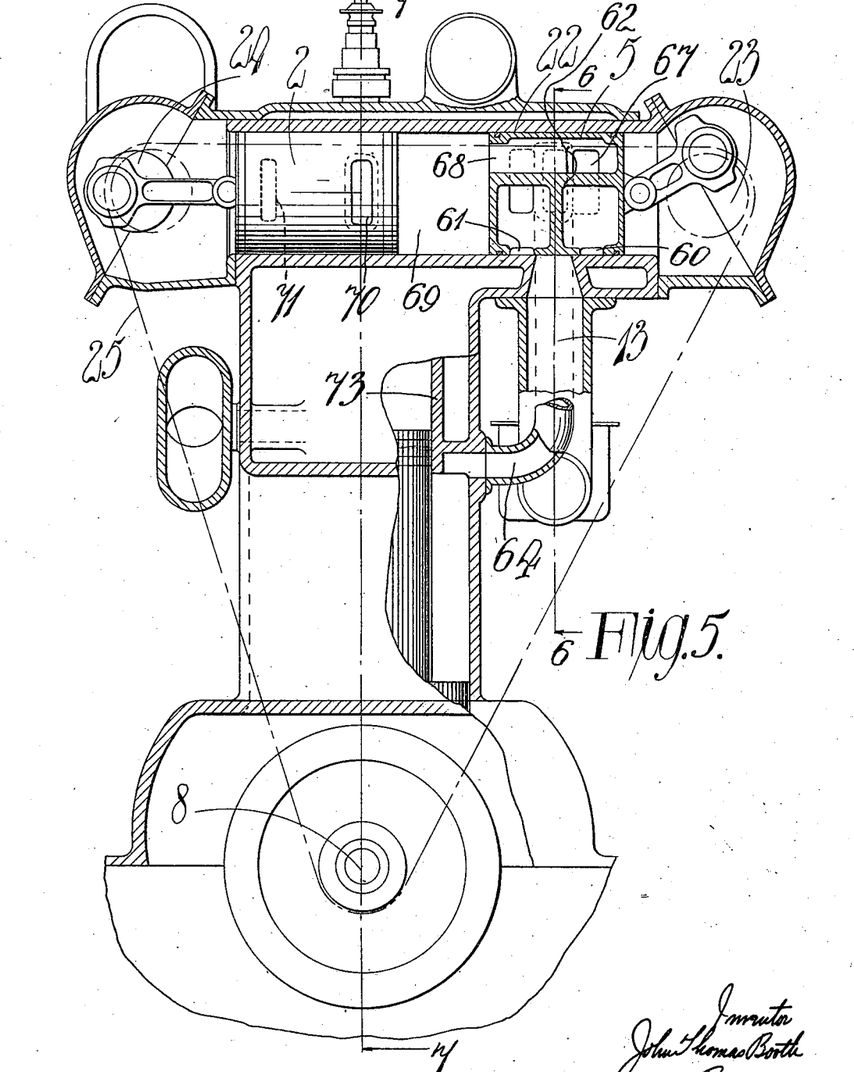
Figure 5 is a transverse sectional end view showing another method of carrying the invention into effect.
Figure 6:
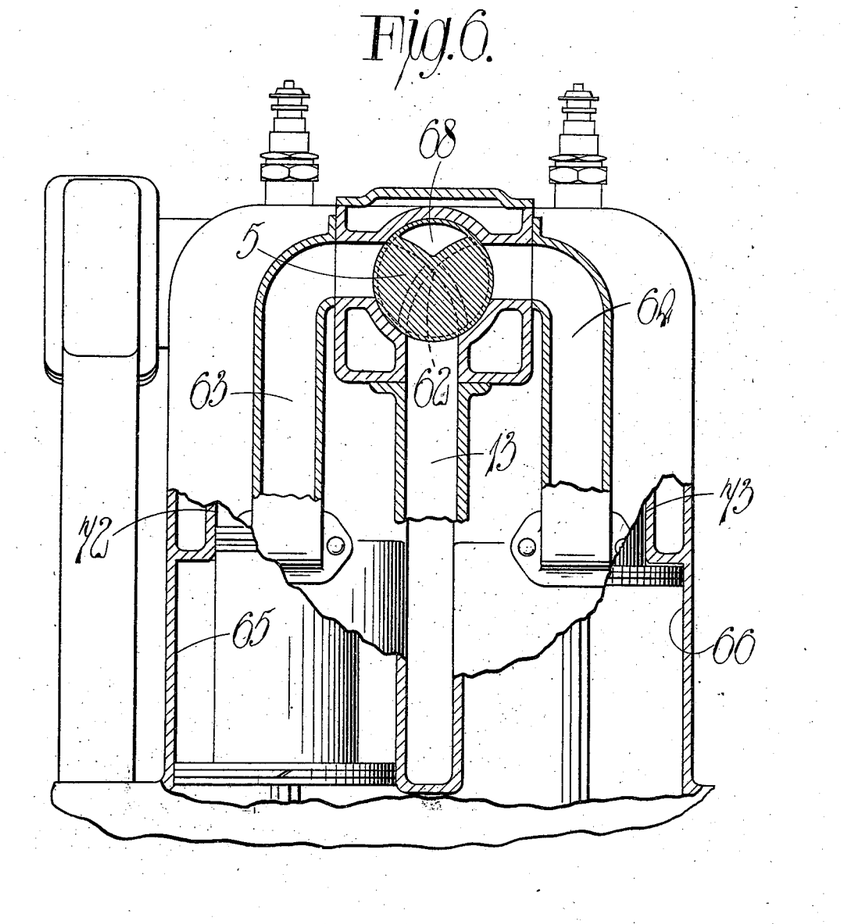
Figure 6 is a longitudinal sectional elevation on line 6—6 in Figure 5.
Figure 7:
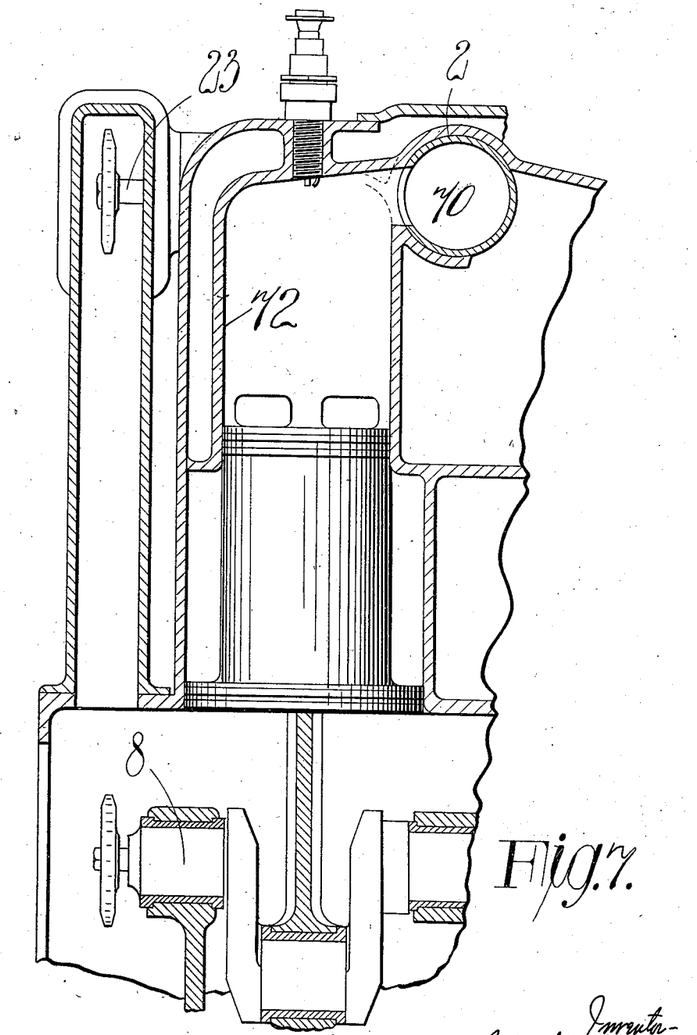
Figure 7 is a longitudinal sectional side elevation of the construction shown in Figure 5 taken on the line 7—7 in that Figure.
Figure 8:
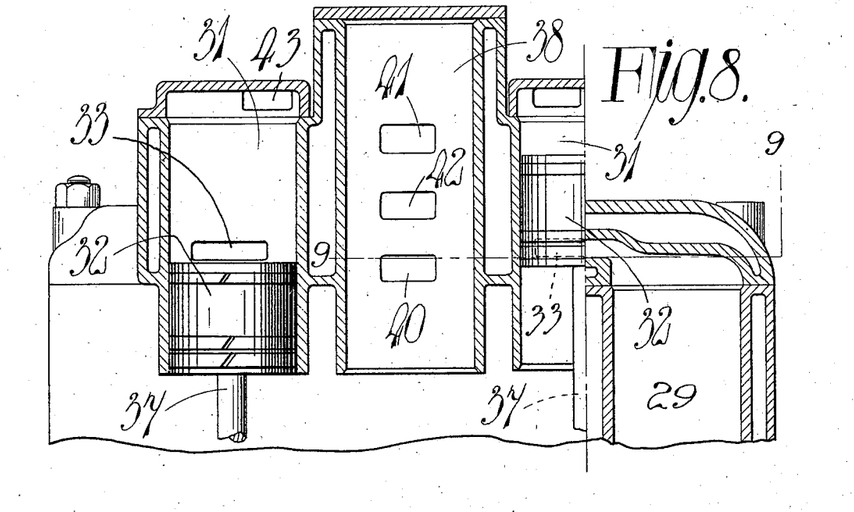
Figure 8 is a sectional view in side elevation on line C—D of Figure 9.

In the arrangement shown in Figures 5, 6 and 7 instead of placing the inlet valve in a cylinder which has its axis parallel to the axes of the working cylinders, the inlet valve 5 is arranged in a cylinder 22 which also contains the transfer valve 2. In this arrangement the inlet and transfer valves are operated from two separate shafts 23 and 24. Each of these shafts is however, driven by positive gearing from the crank shaft 8 of the engine and in one arrangement an endless driving chain 25 may be employed passing over sprockets upon the three shafts.

In this case the gas passes under control of the valve 5 from the induction pipe through one of the ports 60—61, through the passages in the valve which are closed by diaphragms 62 into either of the passages 63 or 64 to the pump cylinders 65 or 66. From there the gas is transferred through the ports 67 to the interior of the valve and from there through the opening 68 in the end, into the receiver 69.

The gas then passes from the receiver 69 by way of the open inner end of the valve 2 through one of the parts 70—71 into the combustion space of the cylinder 72 or 73, as the case may be, as shown in Figure 7.

In the construction shown in Figures 8, 9, 10 and 11, the invention is shown applied to a four cylinder engine in which two of the working cylinders 27 are provided with pumps 28 while the other two working cylinders 29 have no pumps. The arrangement is such that the volume of the pump cylinders 28 is sufficient for the supply of fuel to all four working cylinders.

A valve 30 is provided for controlling the inlet of gas to the pump cylinders 28 and for controlling the transfer of the gas from the pump cylinders to the receivers 31. Each receiver is provided with a piston 32 which operates as a valve by its action of covering or uncovering ports 33 leading from the receivers to the working cylinders.

Figure 10:
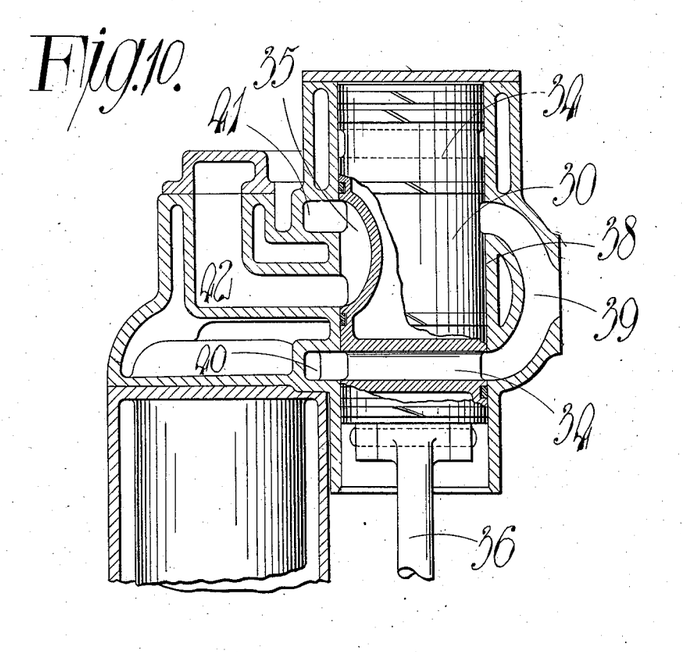
Figure 10 is a sectional end view on line E—F of Figure 9.
Figure 11:
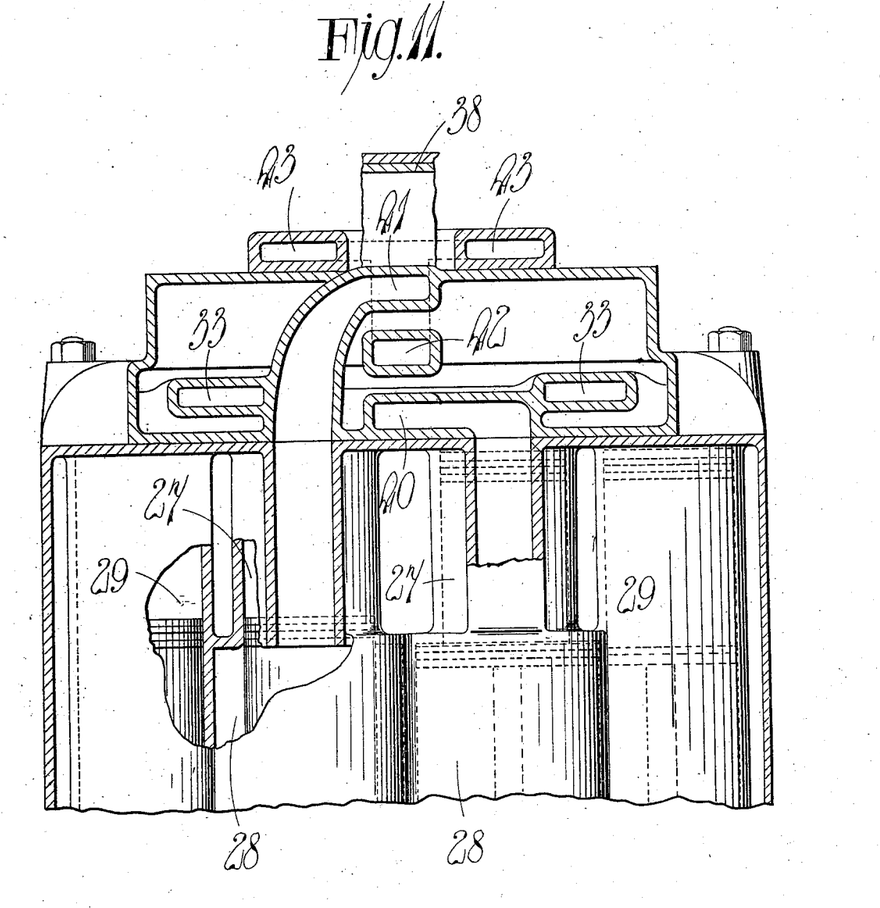
Figure 11 is a sectional view on the line 11—11 in Figure 9.

In this construction the valve 30 is provided with two ports or passages 34 which pass more or less diametrically through the valve. In addition the valve 30 is provided with a transfer port or cavity 35.

The valve 30 is driven by a connecting rod 36 from a crank shaft or its equivalent which may be geared to the main crank shaft of the engine. The crank shaft or its equivalent which drives the connecting rod 36 may also drive the connecting rods 37 attached to the pistons 32.

The valve 30 operates in a valve cylinder 38 and leading into this cylinder is a passage 39 to which the induction pipe is connected. The passage 39 has two branches as shown and the reciprocation of the valve 30 alternately places one branch of the passage 39 into communication with a port 40 leading to one pump and the other branch of the passage 39 into communication with the port 41 which leads to the other pump.

When the valve is in the position shown in which the induction pipe is in communication with the passage 40, the transfer cavity 35 places the passage 41 from the other pump into communication with the passage 42 leading to one of the receivers 31.

Figure 9:
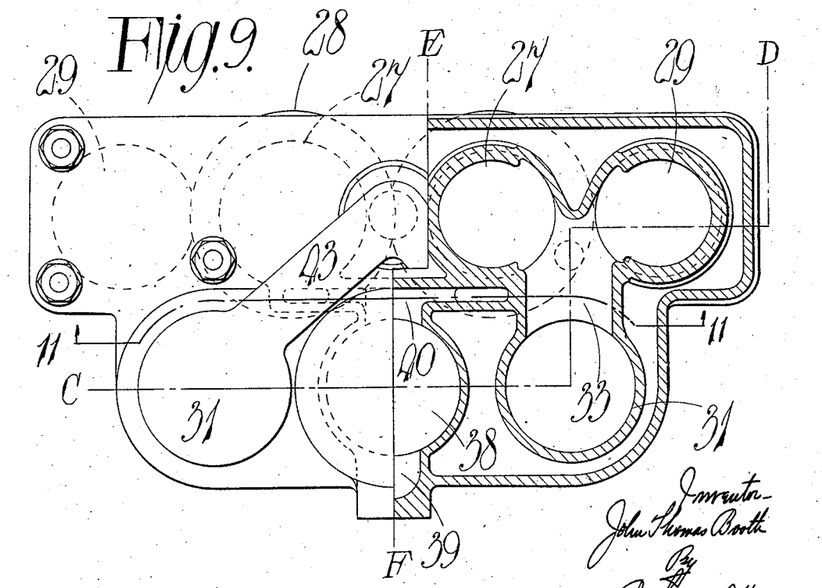
Figure 9 is a part-sectional plan view on line 9—9 of Figure 8.

As will be seen from Figure 9 the two receivers are connected by a pipe 43.

The receivers are supplied with a definite volume of gas by the up-stroke of the engine and this gas is distributed by the action of the piston valves 32 to the four working cylinders through the ports 33 as shown in Figure 9.

At the moment of commencing to open to intake and transfer, the connecting rod 36 is substantially at right angles to its crank or equivalent so that in these positions the valve 30 is moving at its maximum speed thus giving a quick opening and closing of the intake and transfer ports. On the other hand, while the intake and transfer ports are substantially fully open, the valve is moving at its minimum speed.

In the construction shown in Figures 12, 13, 14 and 15 the invention is shown applied to a two cylinder engine wherein adjacent to the cylinder heads are provided an inlet valve cylinder 44 and a transfer valve cylinder 45. These two cylinders are parallel as shown.

In the cylinder, 44 operates a valve 30 which is similar in construction to the valve 30 described with reference to Figure 10. This valve operates in conjunction with a two branched inlet port 39 and with pump ports 40 and 41, the arrangement of which is virtually the same as in the construction shown in Figure 10. The valve 30 is also provided with the cavity 35 which places the pump ports alternately into communication with a passage 46 which is in communication with the receiver 47 (see Figure 13).

Figure 12:
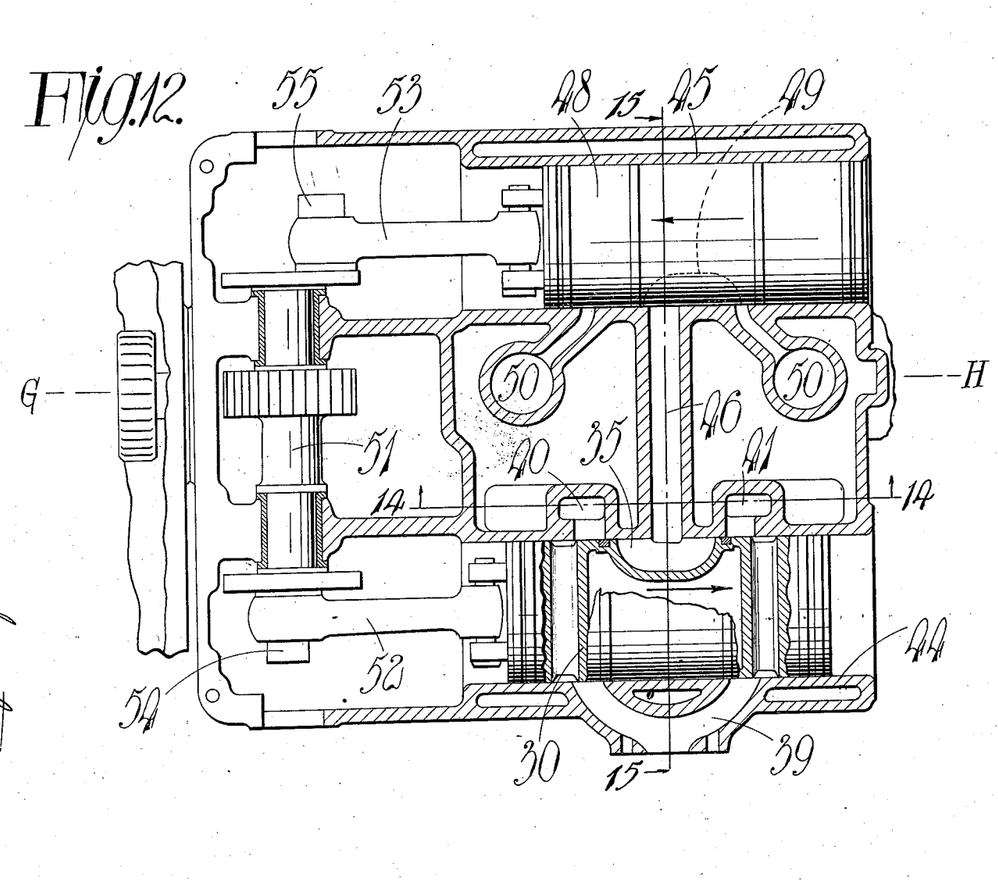
Figure 12 is a sectional vertical view showing another method of carrying out the invention.
Figure 13:
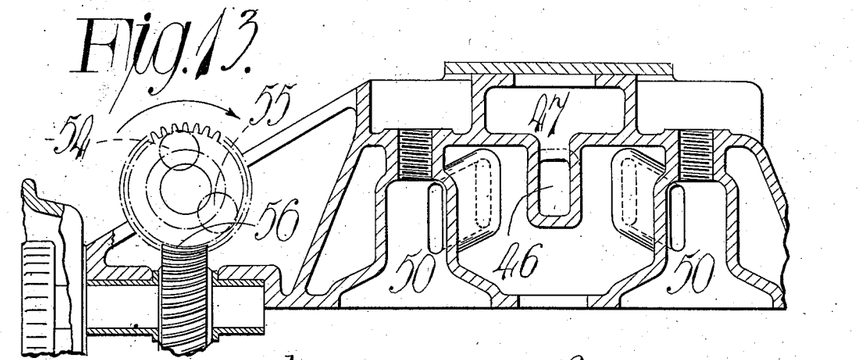
Figure 13 is a sectional view in side elevation on line G—H of Figure 12.
Figure 14:
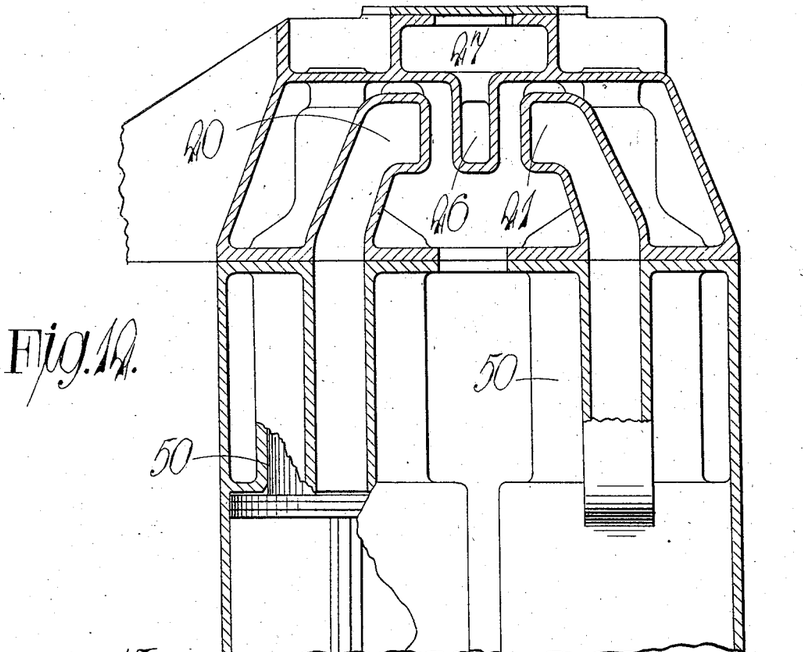
Figure 14 is a sectional view on line 14—14 in Figure 12.
Figure 15:
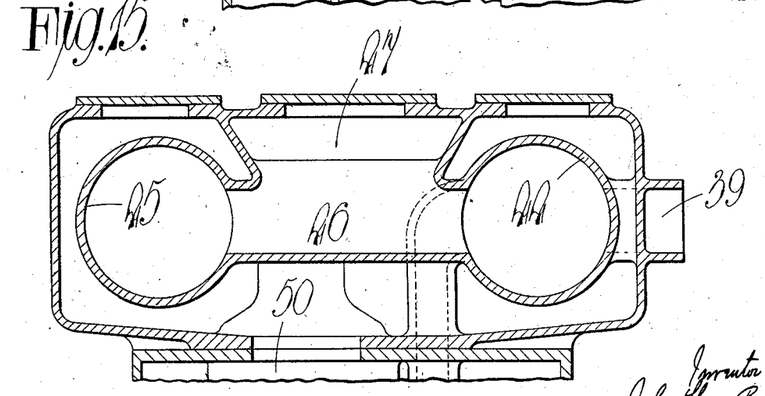
Figure 15 is a sectional view on the line 15—15 of Figure 12.

The passage of the gas from the receiver 47 to the working cylinders is controlled by a transfer valve 48 which reciprocates in the cylinder 45. The transfer valve 48 is provided with a transfer cavity 49 or transfer port or passage which alternately places the receiver into communication with the working cylinders 50.

The valves 30 and 48 in this construction are operated from the same crank shaft 51 by connecting rods 52 and 53 working off crank pins 54 and 55.

The angle between the cranks having the crank pins 54 and 55 is shown in Figure 13, the arrangement being such that when the inlet valve 30 is just beginning to open as shown, the transfer valve 48 is fully open.

In these positions, the inlet valve is moving quickly as its crank is approximately at right angles to its connecting rod while the transfer valve is moving slowly as its crank and connecting rod are substantially in alignment.

The crank shaft 51 may be driven in any suitable manner such as a skew gearing 56 which is shown.

Figure 16:
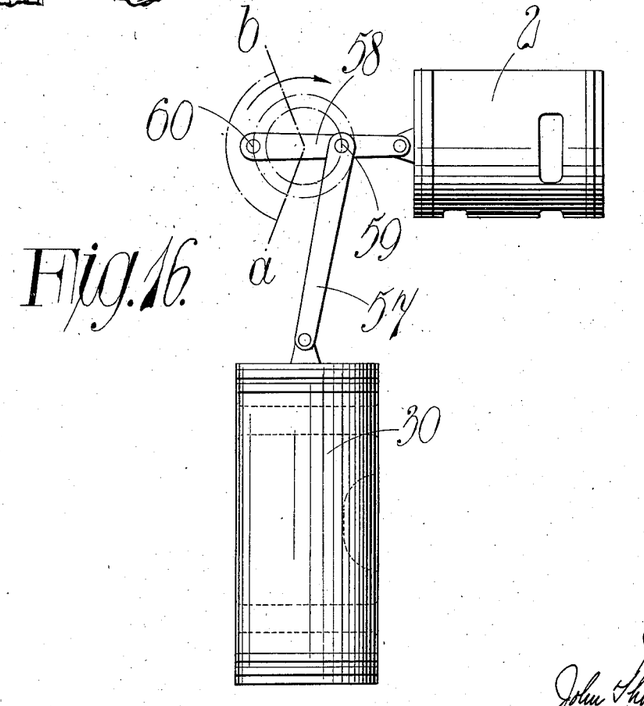
Figure 16 is a diagram showing a further arrangement of valves.

In the diagram shown in Figure 16 are shown an intake valve 30 similar to that shown in Figure 10 in combination with a transfer valve 2 as employed in Figure 1. The valve 30 is driven by a connecting rod 57 while the valve 2 is driven by a connecting rod 58. The connecting rod 57 is connected to a crank pin 59 while the connecting rod 58 is connected to a crank pin 60.

In the position shown the intake valve is about to open for the inlet of gas and its connecting rod 57 is substantially at right angles to its crank or equivalent so that the valve is moving at approximately its maximum speed. The period of opening of the intake valve extends from the position shown to a position in which the crank has rotated through about a semi-circle so that when the intake valve closes it is again moving at its maximum speed. When the intake valve is fully opened however, the connecting rod 57 is in alignment with its crank so that the valve 30 is then moving at its minimum speed.

The transfer valve 2 is shown in a position in which it is fully open and the connecting rod 58 is in alignment with its crank so that the transfer valve is moving at its minimum speed. The angle through which the crank connected to the connecting rod 58 moves during the period of opening of the transfer valve, is shown by the radial lines a—b so that it will be seen that during the whole period in which the transfer valve is open, the transfer valve is moving relatively slowly.

Although I have described my invention as applied to two cylinder engines or engines having multiples of two cylinders, it can be applied to single cylinder engines.

What I claim then is:—

1. In an internal combustion engine the combination of a working cylinder, a working piston in said cylinder, a pump cylinder, a pump piston integral with said working piston in said pump cylinder, a receiving chamber for gas delivery from the pump cylinder, a valve cylinder, an inlet passage for gas in said cylinder, a port connecting said cylinder with the pump cylinder, a hollow reciprocating inlet valve in said valve cylinder, a closed transverse port in said valve, a port in said valve communicating with its hollow interior, a passage from the valve cylinder to the receiver, a passage from the receiver to the working cylinder, and an independent reciprocating transfer valve controlling the passage from the receiver to the working cylinder.

2. In an internal combustion engine the combination of a working cylinder, a working piston in said cylinder, a pump cylinder, a pump piston in said pump cylinder, a receiving chamber for gas delivered from the pump cylinder, an inlet passage for gas leading to the pump cylinder, a passage from the pump cylinder to the receiver, a passage from the receiver to the working cylinder, a reciprocating inlet valve controlling the inlet passage to the pump cylinder, and the passage from the pump cylinder to the receiver, an independent reciprocating transfer valve controlling the passage from the receiver to the working cylinder, means comprising crank and connecting rod for reciprocating said inlet valve and means comprising crank and connecting rod for reciprocating said transfer valve, said inlet valve being fully open when in mid position for the passage of gas to the pump cylinder and said transfer valve having its open position near the ends of its stroke for the passage of gas to the working cylinder.

3. In an internal combustion engine the combination of a plurality of working cylinders, pumping cylinders associated with some of said working cylinders, pistons in said working and pump cylinders, a receiver for gas delivered by the pumping pistons, an inlet passage for gas leading to the pump cylinder, a passage from the pump cylinder to the receiver, a passage from the receiver to the working cylinder, a single reciprocating inlet valve disposed within the said inlet passage and in the passage from the pump cylinder to the receiver to control the inlet of gas to all the pumping cylinders and the passage of gas from the pumping cylinders to the receiver, an independent reciprocating transfer valve controlling the passage of gas from the receiver to the working cylinders, and means for moving said valves.

4. In an internal combustion engine the combination of a plurality of working cylinders, pumping cylinders associated with some of said working cylinders, pistons in said working and pump cylinders, a receiver for gas delivered by the pumping piston, a single reciprocating inlet valve controlling the inlet of gas to all the pumping cylinders and the passage of gas from the pumping cylinders to the receiver, a pair of reciprocating transfer valves arranged parallel to said inlet valve, and means for moving said valves.

In witness whereof I affix my signature.

JOHN THOMAS BOOTH.